(12) United States Patent
Koyama (10) Patent No.: US 7,728,847 B2
(45) Date of Patent: Jun. 1, 2010

(54) COLOR CONVERSION DEVICE AND IMAGE DISPLAY APPARATUS HAVING THE SAME

(75) Inventor: Fumio Koyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 650 days.

(21) Appl. No.: 11/674,909

(22) Filed: Feb. 14, 2007

(65) Prior Publication Data
US 2007/0229532 A1   Oct. 4, 2007

(30) Foreign Application Priority Data
Mar. 29, 2006  (JP) .............................. 2006-089952

(51) Int. Cl.
  *G09G 5/02*  (2006.01)
(52) U.S. Cl. .................. 345/601; 345/589; 345/600; 345/602; 345/606; 382/167
(58) Field of Classification Search .................. None
  See application file for complete search history.

(56) References Cited

U.S. PATENT DOCUMENTS

| | | | | |
|---|---|---|---|---|
| 5,748,195 A | * | 5/1998 | Nin | 345/604 |
| 6,040,926 A | * | 3/2000 | Vondran, Jr. | 358/525 |
| 6,304,671 B1 | * | 10/2001 | Kakutani | 382/167 |
| 6,922,197 B2 | * | 7/2005 | Saito | 345/602 |
| 7,068,859 B2 | * | 6/2006 | Hiratsuka et al. | 382/300 |
| 7,382,489 B2 | * | 6/2008 | Curry et al. | 358/1.9 |
| 7,551,796 B2 | * | 6/2009 | Ohyama et al. | 382/274 |
| 2006/0114528 A1 | * | 6/2006 | Ito | 358/525 |

FOREIGN PATENT DOCUMENTS

| | | |
|---|---|---|
| JP | A 58-16180 | 1/1983 |
| JP | A 5-328113 | 12/1993 |
| JP | A-2005-278072 | 10/2005 |
| JP | A 2005-304012 | 10/2005 |
| JP | A 2006-33320 | 2/2006 |

\* cited by examiner

*Primary Examiner*—Antonio A Caschera
(74) *Attorney, Agent, or Firm*—Oliff & Berridge PLC (57) ABSTRACT

A color conversion device includes a three-dimensional lookup table and an interpolation unit. The interpolation unit includes a plurality of operation circuits for realizing an operation process.

6 Claims, 4 Drawing Sheets

COLOR CONVERSION DEVICE AND IMAGE DISPLAY APPARATUS HAVING THE SAME

BACKGROUND

1. Technical Field

The present invention relates to a color conversion device, which is input with three input signals representing colors and performs conversion into set colors from the input signals, and an image display apparatus having the color conversion device.

2. Related Art

Some of the known color printers, color copying machines, color televisions, or color projectors includes a color conversion device using a three-dimensional lookup table (hereinafter, referred to as '3D-LUT') in order to realize the accurate color reproduction with respect to an image corresponding to an input signal. In general, R, G, and B signals as input signals are expressed as 8-bit or more gray-scale data, that is, grayscale levels corresponding to 256 or more gray scales. Accordingly, the 3D-LUT is requested to store (256×256×256) or more output values (output color values), in correspondence with all combinations of gray scales of the R, G, and B signals. For this reason, the 3D-LUT needs an extremely large memory capacity.

Therefore, in an actual 3D-LUT, a necessary memory capacity is reduced by using a configuration in which output color values corresponding to combinations of approximate gray scales obtained by dividing gray scales of each of the R, G, and B signals with proper distances, for example, combinations of gray scales of the R, G, and B signals corresponding to upper three or four bits are stored. In addition, on the basis of a lower bit portion excluding the upper three or four bits, an interpolation operation on the output color values obtained from the 3D-LUT is performed (for example, refer to JP-A-58-16180).

Figure 4:
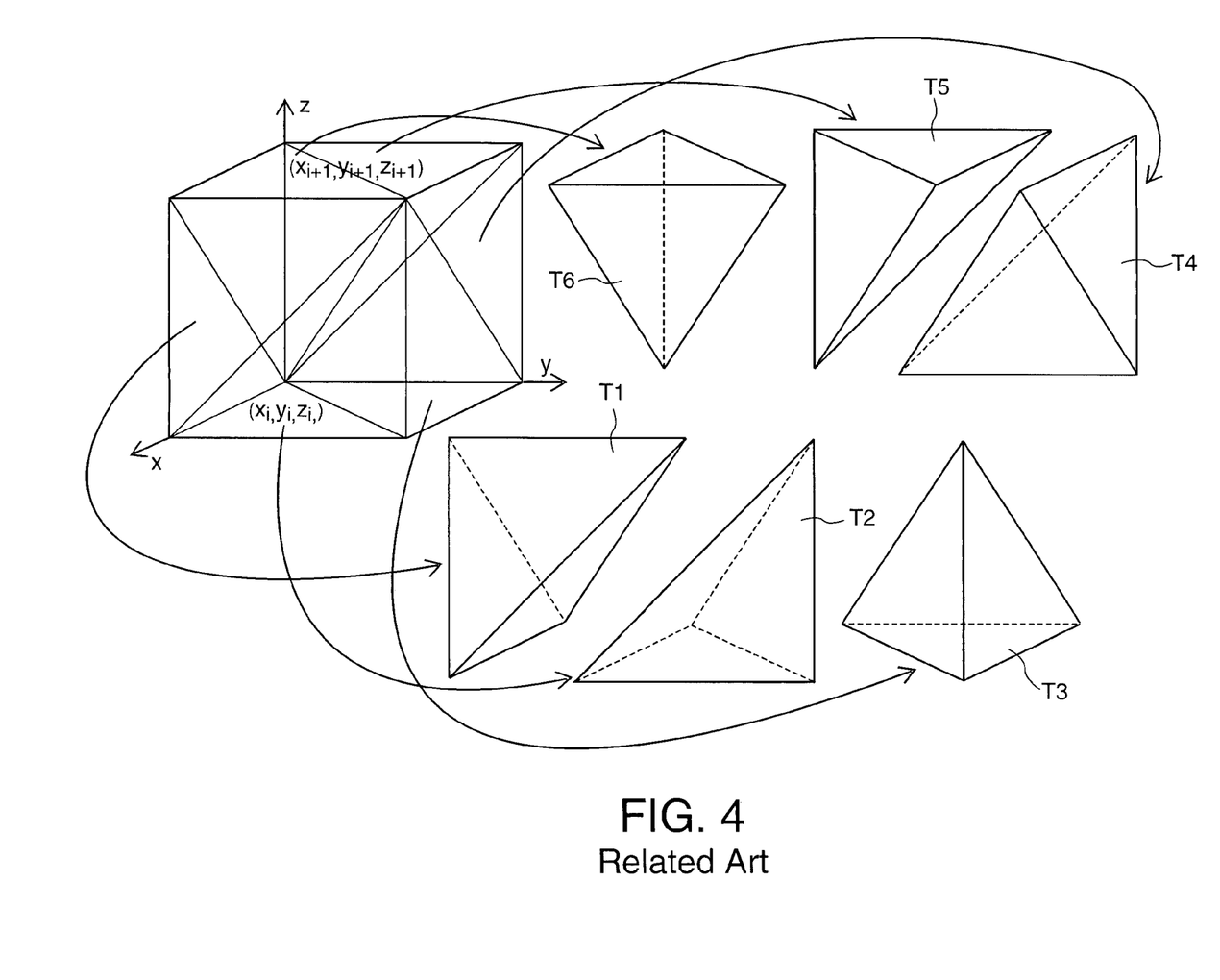
FIG. 4 is an explanatory view illustrating a method of dividing a cube region into six cubes, which is applied to both the embodiment and the related art.

An example of an interpolation method disclosed in JP-A-58-16180 is expressed by using FIG. 4 and the following expression A.

$$U(x, y, z) = U(x_i, y_i, z_i) \cdot (1 - x_f) + U(x_i + 1, y_i, z_i) \cdot (x_f - y_f) + \quad (A)$$
$$U(x_i + 1, y_i + 1, z_i) \cdot (y_f - z_f) + U(x_i + 1, y_i + 1, z_i + 1) \cdot z_f$$

FIG. 4 illustrates a method of dividing a cube region, and a cube region to be interpolated is divided on the basis of three planes of x=y, y=z, and z=x. As a result, the cube region is divided into six tetrahedrons T1 to T6. The expression A indicates an interpolation method in the second tetrahedron T2. Here, $x_i, y_i, z_i$ refers to an upper bit portion of an input, $x_f, y_f, z_f$ refers to a lower bit portion of the input, and $U(x, y, z)$ refers to an output color value in an input $(x, y, z)$. The length of a side of the cube region is '1'. In the interpolation method, the size relation in a lower bit portion indicating a point to be interpolated is examined, it is determined whether the point to be interpolated is included in which tetrahedron, output color values corresponding to four apices of the corresponding tetrahedron are called from a color correction memory, and the output color values are multiplied by four coefficients obtained by subtraction of the lower bit portion and then respective results are added.

In the known technique described above, four multipliers are needed, as can be seen from the expression A. Since the circuit size of a multiplier is large, it is required to decrease the number of multipliers in order to make a device small. Accordingly, it may be considered to decrease the number of multipliers by changing the expression A to expression B.

$$U(x, y, z) = U(x_i, y_i, z_i) + [U(x_i + 1, y_i, z_i) - U(x_i, y_i, z_i)] \cdot \quad (B)$$
$$x_f + [U(x_i + 1, y_i + 1, z_i) - U(x_i + 1, y_i, z_i)] \cdot y_f +$$
$$[U(x_i + 1, y_i + 1, z_i + 1) - U(x_i + 1, y_i + 1, z_i)] \cdot z_f$$

In a color conversion device designed according to the expression B, it is possible to make a device small. However, a problem that the gray balance is easily adversely affected has occurred in the following reasons.

As for colors on a diagonal axis in the cube region, R=G=B is satisfied. Accordingly, the colors on the diagonal axis correspond to colors on a gray axis in a color space. For this reason, in the case when color conversion into a value deviating from the gray axis is made even though color conversion into a color on the gray axis should be actually made, the difference is easily determined by human eyes. In contrast, in the color conversion device designed according to the expression B, even when input signals are values on a gray axis on which R=G=B, that is, $x_f=y_f=z_f$ are satisfied, the conversion into colors other than a gray color is easily made if quantization errors of respective multipliers are accumulated. That is, there has been a problem in that the gray balance is easily adversely affected.

SUMMARY

An advantage of some aspects of the invention is to make a device small by reducing the number of multipliers and to stabilize the gray balance.

In order to achieve the above objects, according to a first aspect of the invention, a color conversion device includes: a three-dimensional lookup table that divides a three-dimensional color space obtained by three input signals representing colors into a plurality of cube regions, stores output color values with respect to lattice points of the cube regions, and divides each of the input signals into an upper bit portion and a lower bit portion and then outputs each of the output color values as reference data on the basis of a set of the upper bit portion; and an interpolation unit that generates a set of output signals corresponding to the respective input signals by dividing the cube region to be interpolated into six tetrahedrons each of which a diagonal line obtained by connecting a first point, at which the reference data is stored, with a second point farthest from the first point is a ridge line, selecting one of the tetrahedrons on the basis of a set of the lower bit portion, and performing an interpolation operation among the output color values with respect to each apex of the selected tetrahedron. The interpolation unit includes a plurality of operation circuits for realizing an operation process based on the following expression.

$$P = K + (W - K) \cdot h/E - (W - T) \cdot (h - n)/E - (T - S) \cdot (h - m)/E \quad (C)$$

Here, P is a value representing the set of output signals, K is a value of the reference data, that is, an output color value with respect to the first point of the apices of the tetrahedron, W is an output color value with respect to the second point of the apices of the tetrahedron, S is an output color value with respect to a third point of the apices of the tetrahedron, the third point being one of remaining two points other than the first and second points that is closer to the first point, T is an output color value with respect to a fourth point of the apices of the tetrahedron, the fourth point being a remaining point other than the first, second, and third points, E is a length of a side of the cube region, and h, m, and n are any one of $x_f$, $y_f$, and $z_f$ indicating coordinate positions, each of which is determined by the set of the lower bit portion, in the cube region to be interpolated and are determined on the basis of size relation among $x_f$, $y_f$, and $z_f$ as follows, the size relation among $x_f$, $y_f$, and $z_f$ indicating which of the tetrahedrons is to be selected on the basis of the set of the lower bit portion. That is, if $x_f \geq z_f \geq y_f$, $h=x_f$, $m=z_f$, $n=y_f$,
if $x_f \geq y_f > z_f$, $h=x_f$, $m=y_f$, $n=z_f$,
if $y_f > x_f \geq z_f$, $h=y_f$, $m=x_f$, $n=z_f$,
if $y_f > z_f > x_f$, $h=y_f$, $m=z_f$, $n=x_f$,
if $z_f \geq y_f > x_f$, $h=z_f$, $m=y_f$, $n=x_f$, and
if $z_f > x_f \geq y_f$, $h=z_f$, $m=x_f$, $n=y_f$.

According to the color conversion device described above, an interpolation operation process based on the expression C is performed, and the meaning of the expression C is as follows.

Referring to the expression A described in the 'Related Art', U $(x_i, y_i, z_i)$ corresponds to the 'K', U $(x_i+1, y_i, z_i)$ corresponds to the 'S', U $(x_i+1, y_i+1, z_i)$ corresponds to the 'T', and U $(x_i+1, y_i+1, z_i+1)$ corresponds to the 'W'. Therefore, the expression A can be replaced with the following expression D.

$$U(x,y,z)=K \cdot (1-x_f) + S \cdot (x_f-y_f) + T \cdot (y_f-z_f) + W \cdot z_f \quad (D)$$

The expression D can be changed to the following expression E.

$$U(x,y,z)=K+(W-K) \cdot x_f-(W-T) \cdot (x_f-z_f)-(T-S) \cdot (x_f-y_f) \quad (E)$$

On the other hand, since $h=x_f$, $m=y_f$, $n=z_f$ when $x_f \geq y_f > z_f$, the above expression C in the invention becomes the following expression F when a tetrahedron satisfying the condition of $x_f \geq y_f > z_f$ is selected on the basis of the set of the lower bit portion. Here, the calculation is performed with the length E of a side of the cube region set as a value of '1'.

$$P=K+(W-K) \cdot x_f-(W-T) \cdot (x_f-z_f)-(T-S) \cdot (x_f-y_f) \quad (F)$$

The expression F is the same as the expression E. Accordingly, the color conversion device according to the aspect of the invention can perform the color conversion by using an interpolation process in the same manner as the color conversion device of the related art disclosed in JP-A-58-16180. Moreover, as can be seen from the expression C, since a design can be made such that three multipliers are provided, it is possible to make a device small. In addition, when three input signals are on a gray axis that is, at the time of $x_f=y_f=z_f$ (h=m=n), second and third terms in the expression C become necessarily zero. Even though quantization errors occur in multipliers that are responsible for the second and third terms, the second and third terms in the expression C become necessarily zero. Accordingly, since there remains a possibility that a quantization error will occur in only a multiplier that is responsible for a first term in the expression E, it is possible to stabilize the gray balance, as compared with the related art. That is, the color conversion circuit according to the first aspect of the invention is advantageous in that it is possible to make a device small by reducing the number of multipliers and to stabilize the gray balance.

According to a second aspect of the invention, a color conversion device includes: a three-dimensional lookup table that divides a three-dimensional color space obtained by three input signals representing colors into a plurality of cube regions, stores output color values with respect to lattice points of the cube regions, and divides each of the input signals into an upper bit portion and a lower bit portion and then outputs each of the output color values as reference data on the basis of a set of the upper bit portion; and an interpolation unit that generates a set of output signals corresponding to the respective input signals by dividing the cube region to be interpolated into six tetrahedrons each of which a diagonal line obtained by connecting a first point, at which the reference data is stored, with a second point farthest from the first point is a ridge line, selecting one of the tetrahedrons on the basis of a set of the lower bit portion, and performing an interpolation operation among the output color values with respect to each apex of the selected tetrahedron, wherein the interpolation unit includes a plurality of operation circuits for realizing an operation process based on the following expression when a predetermined tetrahedron of the six tetrahedrons is selected on the basis of the set of the lower bit portion.

$$P=K+(W-K) \cdot x_f/E-(W-T) \cdot (x_f-z_f)/E-(T-S) \cdot (x_f-y_f)/E \quad (G)$$

Here, P is a value representing the set of output signals, K is a value of the reference data, that is, an output color value with respect to the first point of the apices of the tetrahedron, W is an output color value with respect to the second point of the apices of the tetrahedron, S is an output color value with respect to a third point of the apices of the tetrahedron, the third point being one of remaining two points other than the first and second points that is closer to the first point, T is an output color value with respect to a fourth point of the apices of the tetrahedron, the fourth point being a remaining point other than the first, second, and third points, E is a length of a side of the cube region, and $x_f$, $y_f$, and $z_f$ are values indicating coordinate positions, each of which is determined by the set of the lower bit portion, in the cube region to be interpolated.

In the same manner as the color conversion device according to the first aspect of the invention, the color conversion device according to the second aspect of the invention is advantageous in that it is possible to make a device small by reducing the number of multipliers and to stabilize the gray balance.

In the color conversion device according to the first or second aspect of the invention, preferably, the interpolation unit includes five subtractors, three multipliers, and an adder order to realize the expression C or G.

Further, according to a third aspect of the invention, a color conversion device includes: a three-dimensional lookup table that divides a three-dimensional color space obtained by three input signals representing colors into a plurality of cube regions, stores output color values with respect to lattice points of the cube regions, and divides each of the input signals into an upper bit portion and a lower bit portion and then outputs each of the output color values as reference data on the basis of a set of the upper bit portion; and an interpolation unit that generates a set of output signals corresponding to the respective input signals by dividing the cube region to be interpolated into six tetrahedrons each of which a diagonal line obtained by connecting a first point, at which the reference data is stored, with a second point farthest from the first point is a ridge line, selecting one of the tetrahedrons on the basis of a set of the lower bit portion, and performing an interpolation operation among the output color values with respect to each apex of the selected tetrahedron. The interpolation unit includes an interpolation operation unit that performs the interpolation operation, and the interpolation operation unit is configured to include at least three multipliers and to eliminate quantization errors occurring in two of the three multipliers when the three input signals are on a gray axis.

In the color conversion device having the configuration described above, it is possible to make a device small since a design can be made such that three multipliers are provided.

In addition, since the color conversion device is configured such that quantization errors occurring in two of the three multipliers are eliminated when three input signals are on the gray axis, it is possible to stabilize the gray balance as compared with the related art. Therefore, the color conversion circuit according to the third aspect of the invention is advantageous in that it is possible to make a device small by reducing the number of multipliers and to stabilize the gray balance.

In addition, the invention may be realized as an image display apparatus having the color conversion device described above, without being limited to the color conversion device described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
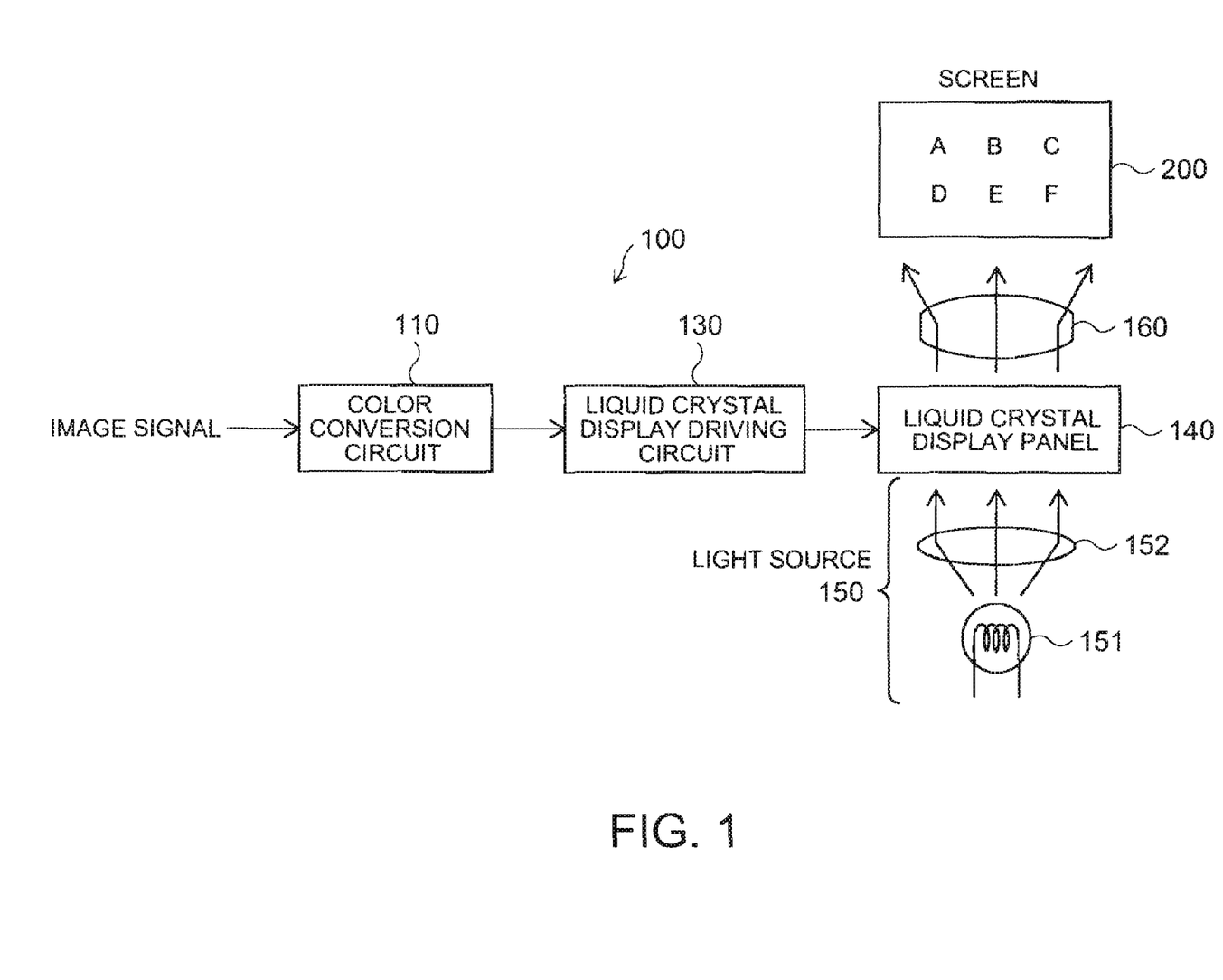
FIG. 1 is a block diagram illustrating the entire configuration of a liquid crystal projector 100 to which a color conversion device as an example of the invention is applied.

Hereinafter, preferred embodiments of the invention will be described by way of examples in the following sequence.
A. Schematic configuration of a liquid crystal projector
B. Color conversion circuit
C. Operation and effects
D. Other embodiments A. Schematic Configuration of a Liquid Crystal Projector FIG. 1 is a block diagram illustrating the overall configuration of a liquid crystal projector to which a color conversion device as an example of the invention is applied. The liquid crystal projector 100 mainly includes a color conversion circuit 110, a liquid crystal display driving circuit 130, a liquid crystal display panel 140, a light source 150, and a projection lens 160. The liquid crystal projector 100 displays an image signal input to the color conversion circuit 110 on a screen 200. In this case, the image signal may be input to the color conversion circuit 110 from an input device, such as a camera, a scanner, or a personal computer (not shown), in a real-time manner or may be read out from a computer-readable storage medium (not shown) to be then input to the color conversion circuit 110. Here, a ROM, a RAM, a CD-ROM, an FD, or an MD may be used as the computer-readable storage medium.

The color conversion circuit 110 is a circuit used to perform color conversion on an image signal as a digital signal, and a color conversion device according to an embodiment of the invention is realized by the color conversion circuit 110. Furthermore, in the case when an image signal is an analog signal, an analog/digital conversion circuit is provided in front of the color conversion circuit 110 although not shown in FIG. 1 such that color conversion is performed after an image signal as an analog signal is converted to an image signal as a digital signal.

The liquid crystal display driving circuit 130 is a circuit used to drive the liquid crystal display panel 140. The liquid crystal display panel 140 is a panel that forms an image based on a signal generated by the liquid crystal display driving circuit 130. The liquid crystal display panel 140 modulates light emitted from the light source 150 and then emits light necessary for projection toward the screen 200.

The light source 150 is a light source used to project an image. The light source 150 mainly includes a lamp 151 serving to generate light and a lens 152 serving to converge the light generated by the lamp 151. The projection lens 160 is a lens that causes light projected from the light source 150 to be displayed on a screen in an enlarged manner.

The screen 200 has a projection surface on which a projection image projected from the projection lens 160 of the liquid crystal projector 100 is displayed. The screen 200 may be a rear-type screen, which is formed integrally with the liquid crystal projector 100, and a front-type screen which is provided separately from the liquid crystal projector 100.

The liquid crystal projector 100 having the configuration described above operates as follows. The color conversion circuit 110 performs color conversion on an input image signal and outputs the image signal to the liquid crystal display driving circuit 130. The liquid crystal display driving circuit 130 reflects the color-converted image signal on the liquid crystal display panel 140. By control of the liquid crystal display driving circuit 130, the liquid crystal display panel 140 modulates light from the light source 150 on the basis of the image signal and causes the light to be transmitted therethrough. The modulated light is projected onto the screen 200 through the projection lens 160, and as a result, an image is displayed on the screen 200.

B. Color Conversion Circuit

Figure 2:
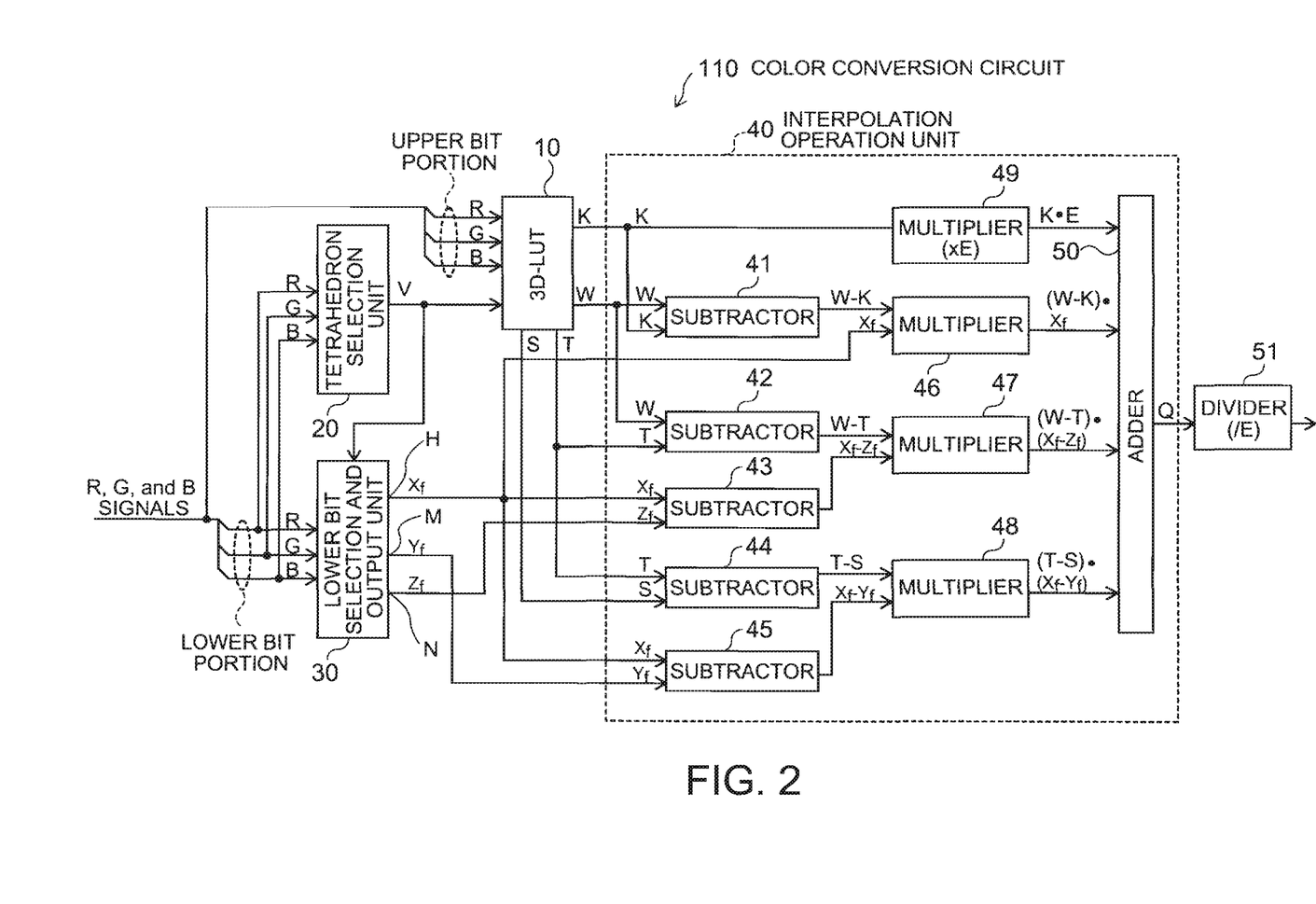
FIG. 2 is a block diagram illustrating details of a color conversion circuit 110 shown in FIG. 1.

Hereinafter, specific configuration and operation of the color conversion circuit 110 will be described. FIG. 2 is a block diagram illustrating details of the color conversion circuit 110 shown in FIG. 1. As shown in FIG. 2 the color conversion circuit 110 includes a three-dimensional lookup table 10 (hereinafter, referred to as '3D-LUT 10'), a tetrahedron selection unit 20, a lower bit selection and output unit 30, and an interpolation operation unit 40.

Each of R, G, and B signals that form an image signal, which is an input signal of the color conversion circuit 110, is divided into an upper bit portion and a lower bit portion. Each upper bit portion thereof is transmitted to the 3D-LUT 10 and each lower bit portion is transmitted to the tetrahedron selection unit 20 and the lower bit selection and output unit 30. Assuming that the number of bits of each of the R, G, and B signals is k (k is an integer of two or more, preferably, k≧8, and here, k=8), the upper bit portion is upper n bits and the lower bit portion is (k−n) bits excluding the upper n bits.

The 3D-LUT 10 is a memory circuit that stores k-bit R signal data, k-bit G signal data, and k-bit B signal data as output color values corresponding to combinations of an upper bit portion of each of the R, G, and B signals. The color conversion circuit 110 outputs (3×k)-bit data according to the combination of the upper bit portion of each of the input R, G, and B signals. In addition, the memory circuit can be implemented by using a RAM having (n+n+n)-bit addresses, specifically, by assigning the (n+n+n)-bit addresses to upper n bits of the R signal, upper n bits of the G signal, and upper n bits of the B signal in the order from upper bits and by assigning a (3×k)-bit output for an output of R signal data, G signal data, and B signal data, for example, every k bits from the upper most bit.

According to the 3D-LUT 10 having the configuration described above, a three-dimensional color space corresponding to three colors of R, G, and B is divided into a plurality of cube regions and output color values (k-bit R signal data, k-bit G signal data, and k-bit B signal data) with respect to lattices points of the cube regions are displayed. The 3D-LUT 10 in the example is configured such that a set of R signal data, G signal data, and B signal data with respect to lattice points corresponding to the combination of an upper bit portion of each of the R, G, and B signals is output as reference data K and three kinds of data W, S, and T are output. These three kinds of data W, S, and T will be described in detail later. Moreover, a lattice point to which the reference data K is output will now be described as a K point. It is assumed that the length of a side of the cube region is E.

The tetrahedron selection unit 20 selects one of six tetrahedrons, which are obtained by dividing the cube region, with reference to the size relation in a lower bit portion of each of the R, G, and B signals and then outputs a result of the selection. That is, the tetrahedron selection unit 20 determines which one of the six tetrahedrons point determined on the basis of a set of a lower bit portion is to be positioned on, with reference to the size relation in each lower bit portion and then outputs, as the result of the selection, an identification signal V for identifying the determined tetrahedron.

The six tetrahedrons are the same as those in the known technique described with reference to FIG. 4 in the above 'Related Art' and are obtained by dividing the cube with three planes of x=y, y=z, and z=x. Thus, the six tetrahedrons T1 to T6 (refer to FIG. 3) are represented by the following six conditional expressions. Expression 1, expression 2, expression 3, expression 4, expression 5, and expression 6 indicate first tetrahedron T1, second tetrahedron T2, third tetrahedron T3, fourth tetrahedron T4, fifth tetrahedron T5, and sixth tetrahedron T6, respectively.

Figure 3:
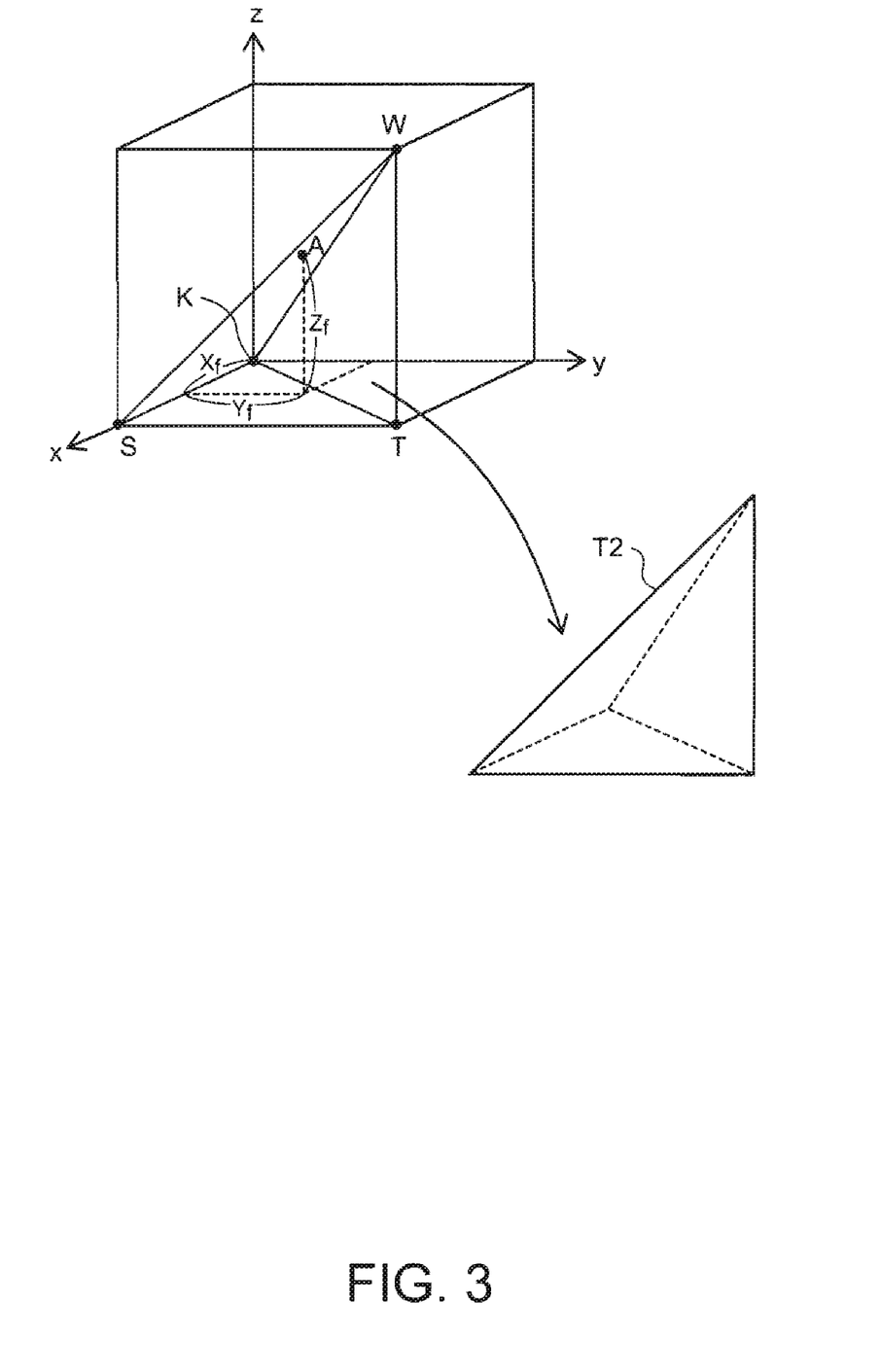
FIG. 3 is an explanatory view conceptually illustrating the shape of a selection process of a tetrahedron performed by a tetrahedron selection unit 20.

$x \geq z \geq y$   Expression 1

$x \geq y > z$   Expression 2

$y > x \geq z$   Expression 3

$y > z > x$   Expression 4

$z \geq y > x$   Expression 5

$z > x \geq y$   Expression 6

FIG. 3 is an explanatory view conceptually illustrating the shape of a selection process of a tetrahedron performed by the tetrahedron selection unit 20. As shown in FIG. 3, assuming that a coordinate position A, which is determined by a set of a lower bit portion of each of the R, G, and B signals, is $(x_f, y_f, z_f)$, it is possible to determine which one of the expressions 1 to 6 the coordinate A corresponds to by examining the size relationship among $x_f$, $y_f$, and $z_f$. As a result, it is possible to know which one of the tetrahedrons T1 to T6 the coordinate A $(x_f, y_f, z_f)$ is positioned on. In the example shown in FIG. 3, it can be seen that the coordinate A $(x_f, y_f, z_f)$ is positioned on the tetrahedron T2 since the coordinate A $(x_f, y_f, z_f)$ satisfies the condition of the expression 2. Accordingly, as shown in FIG. 2, the tetrahedron selection unit 20 outputs as a selection result the identification signal V for identifying the second tetrahedron T2.

The identification signal V output from the tetrahedron selection unit 20 is transmitted to the 3D-LUT 10 and the lower bit selection and output unit 30. As described above, the 3D-LUT 10 outputs the three kinds of data W, S, and T as well as the reference data K as an output color value with respect to the K point determined from the combination of an upper bit portion of each of the R, G, and B signals. At this time, the data S and T are determined according to the identification signal V.

These three kinds of data W, S, and T will be described in detail later. The origin of xyz coordinate shown in FIG. 3 corresponds to the K point corresponding to the combination of an upper bit portion of each of the R, G, and B signals. One of the eight apices of the cube region farthest from the K point is assumed to be a W point. The W point is also a point closest to a white color in the cube region. The division into the six tetrahedron regions is made such that a diagonal line obtained by connecting the K and W points with each other becomes a ridge line. The 3D-LUT 10 outputs an output color value with respect to the W point as the data W closest to a white color.

One tetrahedron, in the example shown in FIG. 3, the second tetrahedron T2 is selected according to the identification signal V transmitted from the tetrahedron selection unit 20. One, which is closer to the K point, of two points of the tetrahedron T2 other than the K and W points is assumed to be an S point. In addition, the other point of the tetrahedron T2 is assumed to be a T point. The 3D-LUT 10 outputs data S of an output color value with respect to the S point and data T of an output color value with respect to the T point. In addition, even if the identification signal V transmitted from the tetrahedron selection unit 20 indicates any one of the other tetrahedrons, one, which is closer to the K point, of two points of the corresponding tetrahedron other than the K and W points is assumed to be an S point and the other point of the corresponding tetrahedron is assumed to be a T point.

The lower bit selection and output unit 30 is input with R, G, and B signals, selects a lower bit portion of each of the R, G, and B signals, and outputs the selected lower bit portion. The lower bit selection and output unit 30 has three output terminals H, M, and N, and decides to respectively output lower bit portions of the R, G, and B signals from which output terminals H, M, and N according to the identification signal V transmitted from the tetrahedron selection unit 20. Specifically, the above decision is made in the following procedures (a) to (f).

(a) In the case when the first tetrahedron T1 is selected, that is, in the case of $x_f \geq z_f \geq y_f$, it is assumed that a signal h output from the output terminal H is a value $x_f$ of a lower bit portion of the R signal, a signal m output from the output terminal M is a value $z_f$ of a lower bit portion of the B signal, and a signal n output from the output terminal N is a value $y_f$ of a lower bit portion of the G signal (that is, $h=x_f$, $m=z_f$, $n=y_f$), (b) In the case when the second tetrahedron T2 is selected, that is, in the case of $x_f \geq y_f > z_f$, $h=x_f$, $m=y_f$, $n=z_f$, (c) In the case when the third tetrahedron T3 is selected, that is, in the case of $y_f > x_f \geq z_f$, $h=y_f$, $m=x_f$, $n=z_f$, (d) In the case when the fourth tetrahedron T4 is selected, that is, in the case of $y_f > z_f > x_f$, $h=y_f$, $m=z_f$, $n=x_f$, (e) In the case when the fifth tetrahedron T5 is selected, that is, in the case of $z_f \geq y_f > x_f$, $h=z_f$, $m=y_f$, $n=x_f$, and (f) In the case when the sixth tetrahedron T6 is selected, that is, in the case of $z_f > x_f \geq y_f$, $h=z_f$, $m=x_f$, $n=y_f$.

In FIG. 2, the second tetrahedron T2 is selected in the tetrahedron selection unit 20, in the same manner as in the example shown in FIG. 3. Accordingly, in FIG. 2, $x_f$ is output from the output terminal H of the lower bit selection and output unit 30, $y_f$ is output from the output terminal M thereof and $z_f$ is output from the output terminal N thereof. Hereinafter, an explanation will be continued on the assumption that $x_f$, $y_f$, and $z_f$ are output from the output terminals H, M, and N, respectively.

The interpolation operation unit 40 includes five subtractors 41, 42, 43, 44, and 45, four multipliers 46, 47, 48, and 49, an adder 50, and a divider 51. The interpolation operation unit 40 performs an interpolation operation by using the reference data K, the data W closest to a white color, and the data S and T of output color values with respect to the S and T points, which are output from the 3D-LUT 10, and the values $x_f$, $y_f$, and $z_f$ output from the lower bit selection and output unit 30.

Specifically, the reference data K output from the 3D-LUT 10 is transmitted to the adder 50 through the multiplier 49 and also transmitted to a subtrahend input terminal of the first subtractor 41. The data W closest to a white color is transmitted to a minuend input terminal of the first subtractor 41 and a minuend input terminal of the second subtractor 42. The data T of the output color value with respect to the T point is transmitted to a subtrahend input terminal of the second subtractor 42 and a minuend input terminal of the fourth subtractor 44. The data S of the output color value with respect to the S point is transmitted to a subtrahend input terminal of the fourth subtractor 44. Accordingly, an operation result of 'W−K' is output from the first subtractor 41, an operation result of 'W−T' is output from the second subtractor 42, and an operation result of 'T−S' is output from the fourth subtractor 44.

On the other hand, the output terminal H of the lower bit selection and output unit 30 is connected to a first terminal of the first multiplier 46, a minuend input terminal of the third subtractor 43, and a minuend input terminal of the fifth subtractor 45, the output terminal M is connected to a subtrahend input terminal of the fifth subtractor 45, and the output terminal N is connected to a subtrahend input terminal of the third subtractor 43. As a result, when the second tetrahedron T2 is selected by the tetrahedron selection unit 20, an operation result of '$x_f-z_f$' is output from the third subtractor 43 and an operation result of '$x_f-y_f$' is output from the fifth subtractor 45.

The output 'W−K' of the first subtractor 41 and the output $x_f$ from the output terminal H of the lower bit selection and output unit 30 are transmitted to the first multiplier 46, and accordingly, an operation result of '(W−K)·$x_f$' is output from the first multiplier 46. The output 'W−T' of the second subtractor 42 and the output '$x_f-z_f$' of the third subtractor 43 are transmitted to the second multiplier 47, and accordingly, an operation result of '(W−T)·($x_f-z_f$)' is output from the second multiplier 47. The output 'T−S' of the fourth subtractor 44 and the output '$x_f-y_f$' of the fifth subtractor 45 are transmitted to the third multiplier 48, and accordingly, an operation result of '(T−S)·($x_f-y_f$)' is output from the third multiplier 48.

The output '(W−K)·$x_f$' of the first multiplier 46, the output '(W−T)·($x_f-z_f$)' of the second multiplier 47, and the output '(T−S)·($x_f-y_f$)' of the third multiplier 48 are input to the adder 50. Furthermore, as described above, the reference data K output from the 3D-LUT 10 is input to the adder 50 through the multiplier 49. The multiplier 49 multiplies an input by a length E of a side of a cube region. Since the length E is generally two's power, such as, 1, 2, 4, 8, 16, ..., bit shift is only performed. As a result, an output value Q that is expressed in the following expression 7 is output from the adder 50.

$$Q=K \cdot E+(W-K) \cdot x_f-(W-T) \cdot (x_f-z_f)-(T-S) \cdot (x_f-y_f) \quad (7)$$

The output value Q of the adder 50 is input to the divider 51, and thus an output value P that is expressed in the following expression 8 is output. The divider 49 divides an input by the length E of a side of a cube region. Since the length E is generally two's power, such as, 1, 2, 4, 8, 16, ..., bit shift is only performed.

$$P=K+(W-K) \cdot x_f/E-(W-T) \cdot (x_f-z_f)/E-(T-S) \cdot (x_f-y_f)/E \quad (8)$$

In the color conversion circuit 110 configured as described above in the example, the output value P expressed in the expression 8 is output. Next, it will be described about what the expression 8 means.

As already described in the above 'SUMMARY', an interpolation method in the second tetrahedron T2 described in the above 'Related Art' may be expressed in the above-described expression E. Here, the expression E is now expressed again.

$$U(x,y,z)=K+(W-K) \cdot x_f-(W-T) \cdot (x_f-z_f)-(T-S) \cdot (x_f-y_f) \quad (E)$$

If the length E of a side of the cube region is considered, the expression E is the same as the expression 8 that indicates the output value P of the color conversion circuit 110. Therefore, the color conversion circuit 110 in the example can perform color conversion by using an interpolation process in the same manner as the color conversion circuit of the related art described in JP-A-58-16180.

As described above, the expression 8 indicating the output value P of the color conversion circuit 110 corresponds to a case in which the second tetrahedron T2 is selected at the time of $x_f \geq y_f > z_f$. In addition, by replacing $x_f$ with the signal h output from the output terminal H of the lower bit selection and output unit 30, $y_f$ with the signal m output from the output terminal M of the lower bit selection and output unit 30, and $z_f$ with the signal n output from the output terminal N of the lower bit selection and output unit 30, the expression 8 can be applied to any case in which one of the tetrahedrons T1 to T6 is selected. A result obtained by replacing $x_f$, $y_f$, and $z_f$ with h, m, and n, respectively is the following expression 9.

$$P=K+(W-K) \cdot h/E-(W-T) \cdot (h-n)/E-(T-S) \cdot (h-m)/E \quad (9)$$

Here, h, m, and n are signals determined by the above (a) to (f).

Therefore, the color conversion circuit 110 in the example can perform color conversion on any region, which is related to one of the tetrahedrons T1 to T6 obtained by dividing the cube region, by using the interpolation process in the same manner as the color conversion circuit of the related art described in JP-A-58-16180.

Moreover, the 3D-LUT 10 in the example corresponds to a 'three-dimensional lookup table' of the invention. In addition, a function of the 3D-LUT 10 that outputs W, T, and S points, the lower bit selection and output unit 30, and the interpolation operation unit 40 correspond to an 'interpolation unit' of the invention.

C. Operation and Effects

According to the color conversion circuit 110 configured as described above in the example, a design can be made such that three multipliers (the multiplier 49 is a simple shift register) are provided, as can be seen from the expression 8 or 9. As a result, it is possible to make a device small. In addition, when three input signals are on a gray axis, that is, at the time of $x_f=y_f=z_f$ (h=m=n), second and third terms in the expression 8 or 9 become necessarily zero. Even though quantization errors occur in multipliers that are responsible for the second and third terms, the second and third terms in the expression 8 or 9 become necessarily zero. Accordingly, since there remains a possibility that a quantization error will occur in only a multiplier that is responsible for a first term in the expression 8 or 9, it is possible to stabilize the gray balance, as compared with the related art. That is, the color conversion circuit 110 in the example is advantageous in that it is possible to make a device small by reducing the number of multipliers and to stabilize the gray balance.

D. Other Embodiments

In addition, the invention is not limited to the above-described example and embodiment but various changes and modifications thereof could be made without departing from the spirit or scope of the invention.

(1) First Modification

In the example described above, the three input signals representing colors are R, G, and B signals. However, instead of the R, G, and B signals, it is possible to use a luminance signal (Y signal) representing luminance (Y), a first color difference signal (U signal) representing a color difference (U) obtained by subtracting the Y signal from the B signal, and a second color difference signal (V signal) representing a color difference (V) obtained by subtracting the Y signal from the R signal. In addition, any kinds of signals may be used as long as the signals are three input signals representing the colors.

(2) Second Modification

The bit number of each of the upper bit portion and the lower bit portion of each of the R, G, and B signals in the example may be different from that in the example. If conditions on the bit width described in the example are satisfied, any number of bits may be used.

(3) Third Modification

In the example described above, the color conversion circuit 110 is configured to perform a calculation process on the basis of the expression 8 or 9. However, it is necessary to be based on the expression 8 or 9. Any configuration may be adopted as long as at least three multipliers are prepared and quantization errors occurring in two of the three multipliers are eliminated when the three input signals are on the gray axis.

(4) Fourth Modification

In the example described above, the liquid crystal projector to which the color conversion device according to the embodiment of the invention is applied has been described; however, the invention is not limited thereto. For example, the color conversion device according to the embodiment of the invention may be applied to a variety of image display apparatuses, such as a projector using a DMD (digital micromirror device), a CRT (cathode ray tube), a PDP (plasma display panel), an FED (field emission display), an EL (electroluminescence), or a direct-view-type liquid crystal display apparatus. Here, the DMD is trademark of Texas Instrument Co. in U.S.A. Furthermore, the color conversion device according to the embodiment of the invention may also be applied to a color printer or a color copying machine.

The entire disclosure of Japanese Patent Application NO. 2006-089952, filed Mar. 29, 2006 is expressly incorporated by reference herein.

What is claimed is:

1. A color conversion device comprising:
a three-dimensional lookup table that divides a three-dimensional color space obtained by three input signals representing colors into a plurality of cube regions, stores output color values with respect to lattice points of the cube regions, and divides each of the input signals into an upper bit portion and a lower bit portion and then outputs each of the output color values as reference data on the basis of a set of the upper bit portion; and an interpolation unit that generates a set of output signals corresponding to the respective input signals by dividing the cube region to be interpolated into six tetrahedrons, each of the tetrahedrons having an edge defined by a diagonal line, the diagonal line obtained by connecting a first point, at which the reference data is stored, with a second point that is farthest from the first point on the cube, the diagonal line being a ridge line, selecting one of the tetrahedrons on the basis of a set of the lower bit portion, and performing an interpolation operation among the output color values with respect to each apex of the selected tetrahedron, wherein the interpolation unit includes a plurality of operation circuits for realizing an operation process based on the following expression:

$$P=K+(W-K)\cdot h/E-(W-T)\cdot (h-n)/E-(T-S)\cdot (h-m)/E,$$

in the expression, P is a value representing the set of output signals,

K is a value of the reference data, that is, an output color value with respect to the first point of the apices of the tetrahedron, W is an output color value with respect to the second point of the apices of the tetrahedron, S is an output color value with respect to a third point of the apices of the tetrahedron, the third point being one of remaining two points other than the first and second points that is closer to the first point, T is an output color value with respect to a fourth point of the apices of the tetrahedron, the fourth point being a remaining point other than the first, second, and third points, E is a length of a side of the cube region, and h, m, and n are any one of xf, yf, and zf indicating coordinate positions, each of which is determined by the set of the lower bit portion, in the cube region to be interpolated and are determined on the basis of size relation among xf, yf, and zf as follows, the size relation among xf, yf, and zf indicating which of the tetrahedrons is to be selected on the basis of the set of the lower bit portion, if xf≧zf≧yf, h=xf, m=zf, n=yf
if xf≧yf>zf, h=xf, m=yf, n=zf
if yf>xf≧zf, h=yf, m=xf, n=zf
if yf>zf>xf, h=yf, m=zf, n=xf
if zf≧yf>xf, h=zf, m=yf, n=xf, and
if zf>xf≧yf, h=zf, m=xf, n=yf.

2. The color conversion device according to claim 1,
wherein the interpolation unit includes five subtractors, three multipliers, and an adder in order to realize the expression.

3. A color conversion device comprising:
a three-dimensional lookup table that divides a three-dimensional color space obtained by three input signals representing colors into a plurality of cube regions, stores output color values with respect to lattice points of the cube regions, and divides each of the input signals into an upper bit portion and a lower bit portion and then outputs each of the output color values as reference data on the basis of a set of the upper bit portion; and an interpolation unit that generates a set of output signals corresponding to the respective input signals by dividing the cube region to be interpolated into six tetrahedrons, each of the tetrahedrons having an edge defined by a diagonal line, the diagonal line obtained by connecting a first point, at which the reference data is stored, with a second point that is farthest from the first point on the cube, the diagonal line being a ridge line, selecting one of the tetrahedrons on the basis of a set of the lower bit portion, and performing an interpolation operation among the output color values with respect to each apex of the selected tetrahedron, wherein the interpolation unit includes a plurality of operation circuits for realizing an operation process based on the following expression when a predetermined tetrahedron of the six tetrahedrons is selected on the basis of the set of the lower bit portion:

$$P=K+(W-K)\cdot xf/E-(W-T)\cdot (xf-zf)/E-(T-S)\cdot (xf-yf)/E,$$

in the expression, P is a value representing the set of output signals,

K is a value of the reference data, that is, an output color value with respect to the first point of the apices of the tetrahedron, W is an output color value with respect to the second point of the apices of the tetrahedron, S is an output color value with respect to a third point of the apices of the tetrahedron, the third point being one of remaining two points other than the first and second points that is closer to the first point, T is an output color value with respect to a fourth point of the apices of the tetrahedron, the fourth point being a remaining point other than the first, second, and third points, E is a length of a side of the cube region, and xf, yf, and zf are values indicating coordinate positions, each of which is determined by the set of the lower bit portion, in the cube region to be interpolated.

4. The color conversion device according to claim 3, wherein the interpolation unit includes five subtractors, three multipliers, and an adder in order to realize the expression.

5. A color conversion device comprising:

a three-dimensional lookup table that divides a three-dimensional color space obtained by three input signals representing colors into a plurality of cube regions, stores output color values with respect to lattice points of the cube regions, and divides each of the input signals into an upper bit portion and a lower bit portion and then outputs each of the output color values as reference data on the basis of a set of the upper bit portion; and an interpolation unit that generates a set of output signals corresponding to the respective input signals by dividing the cube region to be interpolated into six tetrahedrons, each of the tetrahedrons having an edge defined by a diagonal line, the diagonal line obtained by connecting a first point, at which the reference data is stored, with a second point that is farthest from the first point on the cube, the diagonal line being a ridge line, selecting one of the tetrahedrons on the basis of a set of the lower bit portion, and performing an interpolation operation among the output color values with respect to each apex of the selected tetrahedron, wherein the interpolation unit includes an interpolation operation unit that performs the interpolation operation, and the interpolation operation unit is configured to include at least three multipliers and to eliminate quantization errors occurring in two of the three multipliers when the three input signals are on a gray axis.

6. An image display apparatus having the color conversion device according to claim 1.

* * * * *